United States Patent
Eves

(10) Patent No.: US 9,295,938 B2
(45) Date of Patent: Mar. 29, 2016

(54) DEHUMIDIFICATION APPARATUS AND A METHOD OF REGENERATING DESICCANT MATERIAL OF A DEHUMIDIFIER

(75) Inventor: Jonathan Charles Joshua Eves, Aughnacloy (GB)

(73) Assignee: Eco-Nomic Innovatioins LTD, Aughnacoly, County Tryone (GB)

( * ) Notice: Subject to any disclaimer, the term of this patent is extended or adjusted under 35 U.S.C. 154(b) by 100 days.

(21) Appl. No.: 14/241,087

(22) PCT Filed: Sep. 3, 2012

(86) PCT No.: PCT/EP2012/067095
§ 371 (c)(1),
(2), (4) Date: Feb. 26, 2014

(87) PCT Pub. No.: WO2013/030406
PCT Pub. Date: Mar. 7, 2013

(65) Prior Publication Data
US 2014/0366737 A1    Dec. 18, 2014

(30) Foreign Application Priority Data

Sep. 1, 2011 (GB) .................................... 1115100.8

(51) Int. Cl.
*F24F 3/14* (2006.01)
*B01D 53/26* (2006.01)
*B01D 53/04* (2006.01)

(52) U.S. Cl.
CPC .......... *B01D 53/0446* (2013.01); *B01D 53/261* (2013.01); *F24F 3/1423* (2013.01); *B01D 2257/80* (2013.01); *B01D 2259/4009* (2013.01); *F24F 2003/1464* (2013.01); *F24F 2203/1032* (2013.01); *F24F 2203/1056* (2013.01); *Y10T 137/0318* (2015.04)

(58) Field of Classification Search
CPC .. B01D 53/0446; B01D 53/261; B01D 53/06; B01D 2257/80; B01D 2259/4009; F24F 3/1423; F24F 2003/1464; F24F 2203/1032; F24F 2203/1056; Y10T 137/0318
USPC .............. 96/125, 126, 143, 144, 146; 95/113, 95/117, 123
See application file for complete search history.

(56) References Cited

U.S. PATENT DOCUMENTS 2,200,243 A    5/1940    Newton et al.
2,957,321 A    10/1960    Munters et al.
(Continued)

FOREIGN PATENT DOCUMENTS

JP    2002263434 A    9/2002

OTHER PUBLICATIONS

PCT International Search Report as filed in PCT Application No. PCT/EP2012/067095, dated Dec. 3, 2012.

*Primary Examiner* — Frank Lawrence
(74) *Attorney, Agent, or Firm* — Warner Norcross & Judd LLP

(57) ABSTRACT

The present invention relates to dehumidification apparatus and a method of regenerating desiccant material of a dehumidifier. The apparatus comprises a boiler and a desiccant dehumidifier, in which the boiler is coupled to the dehumidifier such that a heated air stream produced by the boiler is channelled to the dehumidifier to provide regeneration air for desiccant material of the dehumidifier. The present invention provides an advantage that low grade heat from a boiler is being used as a cheap heat source for the absorption dehumidifier. The dehumidifier may be a separate part for retrofitting to a boiler, or may alternatively be integrated with the boiler as a single unit.

9 Claims, 2 Drawing Sheets

(56) References Cited

U.S. PATENT DOCUMENTS

Figure 1:
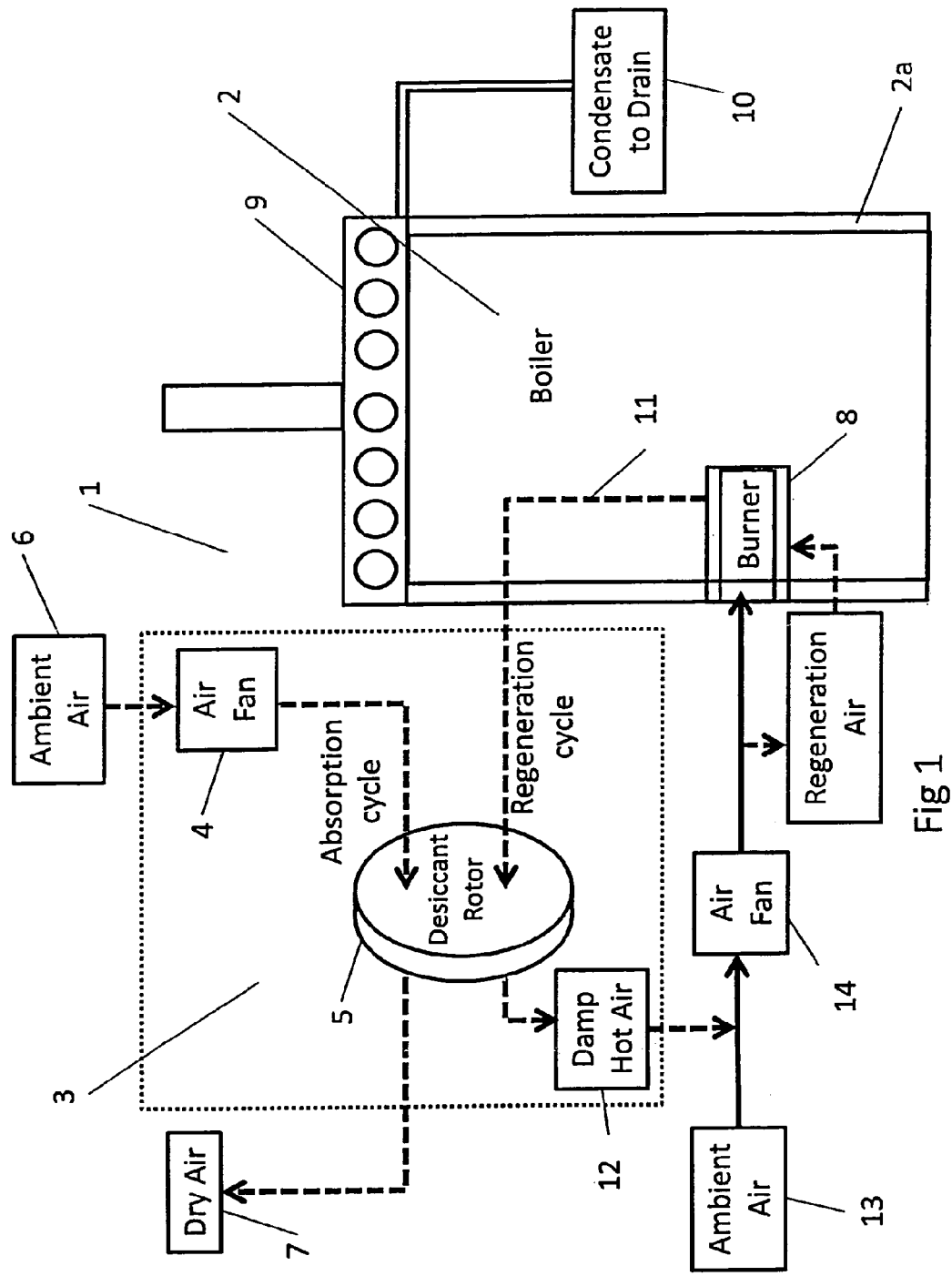

| | | | |
|---|---|---|---|
| 4,113,004 A * | 9/1978 | Rush et al. | 165/7 |
| 5,758,511 A * | 6/1998 | Yoho et al. | 62/271 |
| 5,782,104 A | 7/1998 | Sami et al. | |
| 5,890,372 A | 4/1999 | Belding et al. | |
| 6,694,927 B1 * | 2/2004 | Pouchak et al. | 122/448.1 |
| 2006/0266306 A1 * | 11/2006 | Le Mer et al. | 122/250 R |
| 2008/0083232 A1 * | 4/2008 | Lee | 62/94 |
| 2012/0145000 A1 * | 6/2012 | Chaubey et al. | 95/148 |

\* cited by examiner

DEHUMIDIFICATION APPARATUS AND A METHOD OF REGENERATING DESICCANT MATERIAL OF A DEHUMIDIFIER

The present invention relates to a dehumidification apparatus and a method of regenerating desiccant material of a dehumidifier.

The heating and dehumidification industry faces huge challenges due to increases in population and increases in standards of living, causing greater demand for energy, heightened fuel costs and pressures, such as carbon pricing, exerted by groups and governments who are concerned with the environmental effects caused by the use of certain energy resources. To help address these challenges the industry must develop more energy efficient solutions for providing heating and dehumidification.

Water vapour is continually being added to the occupied built environment due to a damp climate, human and animal respiration, and general domestic operations, such as cooking, showering, laundry and the like. Furthermore, buildings themselves may have structural damp problems. It is well known that water condenses on surfaces when ambient temperature falls, particularly at night, but unfortunately the latent heat of vaporisation is lost from the building as moisture condenses on external walls and windows. This often manifests as steamed up windows. Low occupation buildings, such as holiday homes and churches, are often heated solely to prevent moisture damage to the building and furnishings. Additionally, damp conditions often cause health problems. A wet climate also necessitates the use of tumble dryers to dry clothes. Not only are the energy requirements of such dryers extremely high, the high temperatures in dryers are hard on clothes, often causing cracks in cotton fibres and reducing fabric strength. Moreover, most "designer" clothes are not suitable for tumble drying. A standard dehumidifier requires approximately half the electrical energy that a standard tumble dryer requires to dry 1 kg of laundry. The use of dehumidifiers thus has an important role to play in reducing moisture levels within buildings, and also on reducing overall energy consumption.

Desiccant dehumidification technology can provide energy efficient solutions addressing the above problems. In such dehumidifiers, a desiccant material within the dehumidifier absorbs moisture from the air and its associated latent heat of vaporisation, thereby warming the desiccant. This dried slightly warmed air (from the heat exchange with the warm desiccant) can then be used as necessary. However, to re-use the desiccant within the dehumidifier it must be reactivated using a process in which the captured moisture is driven off by heat from an energy source. This clearly represents an additional demand for energy resources and presents a problem requiring an energy efficient solution.

Electricity is a secondary energy source, and typically has a low combined generation and grid efficiency (typically around 30%), that is used in most dehumidifiers to provide the heat source. However, the heat provided from a condensing boiler is a primary heat source is over 95% efficient.

It is a therefore an object of the present invention to provide an apparatus and method which goes at least some way toward addressing energy efficiency problems within the field and/or which will provide the public and/or industry with a useful alternative.

It is acknowledged that the term 'comprise' may, under varying jurisdictions be provided with either an exclusive or inclusive meaning. For the purpose of this specification, and unless otherwise noted explicitly, the term comprise shall have an inclusive meaning—i.e. that it may be taken to mean an inclusion of not only the listed components it directly references, but also other non-specified components. Accordingly, the term 'comprise' is to be attributed with as broader interpretation as possible within any given jurisdiction and this rationale should also be used when the terms 'comprised' and/or 'comprising' are used.

Further aspects of the present invention will become apparent form the ensuing description which is given by way of example only.

According to the invention, there is provided a dehumidification apparatus comprising:
  a desiccant dehumidifier;
  characterised in that the dehumidification apparatus comprises coupling means for connecting the dehumidifier to a boiler operable to generate a heated air stream, and
  channelling means to channel the heated air stream to the dehumidifier to regenerate desiccant material of the dehumidifier.

The advantage of the present invention is that the heated air from the boiler may be used for regeneration of the desiccant in the dehumidifier. In this way the low grade heat from the boiler (a primary heat source) is being used as a cheaper, lower carbon heat source for the absorption dehumidifier than electricity. The dehumidifier may be a separate part for retrofitting to a boiler, or may alternatively be an integrated part of the boiler and the combined boiler dehumidification system may reduce a buildings overall carbon emissions.

In another embodiment of the invention, the dehumidification apparatus comprises channelling means for channelling an air stream discharged by the dehumidifier to the boiler. This has the advantageous effect of reducing NOx emissions of the boiler as NOx emissions vary inversely to moisture content of the combustion air.

In an alternative embodiment, the dehumidification apparatus further comprises mixing means operable to combine ambient air with the air stream discharged by the dehumidifier. In this way an air stream discharged from the dehumidifier is supplemented with an air supply before being fed to the boiler burner.

In another embodiment of the invention, the boiler and the dehumidifier are integrated as a single unit.

In another embodiment of the invention, the dehumidifier is separate from the boiler and comprises of couplings enabling it to be fitted to a boiler.

In another embodiment of the invention, air is channelled from the ambient to a hollow casing of the burner or to a simple heat exchanger of the burner or hearth in the case of a solid fuel boiler. The advantage of this feature is that the air from the dehumidifier may be used as a coolant around or within the burner or hearth thus reducing flame temperature and consequent NOx production.

In another embodiment of the invention, the central heating water is used to heat the regeneration air.

In another embodiment heating the air supplied to the burner increases combustion efficiency of the boiler.

In another embodiment of the invention, the boiler is a condenser boiler.

Preferably, the condenser boiler comprises of a drain for channelling condensate generated during combustion and moisture recovered from the high relative humid air stream discharged from the dehumidifier out through the boiler.

In another embodiment the dehumidifier could be a refrigerant dehumidifier in which the moisture removed from the building is channelled through a boiler which provides a drain for the water.

According to a further aspect of the invention, there is provided a method of regenerating desiccant material of a dehumidifier characterised by the steps of:

coupling a desiccant dehumidifier to a boiler operable to generate a heated air stream, and channelling the heated air stream to the dehumidifier to regenerate desiccant material of the dehumidifier.

Preferably, the method comprises a further step of: channelling an air stream discharged by the dehumidifier to the boiler.

Preferably, the method comprises a further step of: channelling the air stream discharged by the dehumidifier to a burner of the boiler.

Preferably, the method comprises a further step of: combining ambient air with the air stream discharged by the dehumidifier.

Preferably, the method comprises a further step of: integrating the boiler and the dehumidifier as a single unit.

Preferably, the method comprises a further step of: retrofitting the dehumidifier to the boiler or retrofitting the boiler to the dehumidifier.

Figure 2:
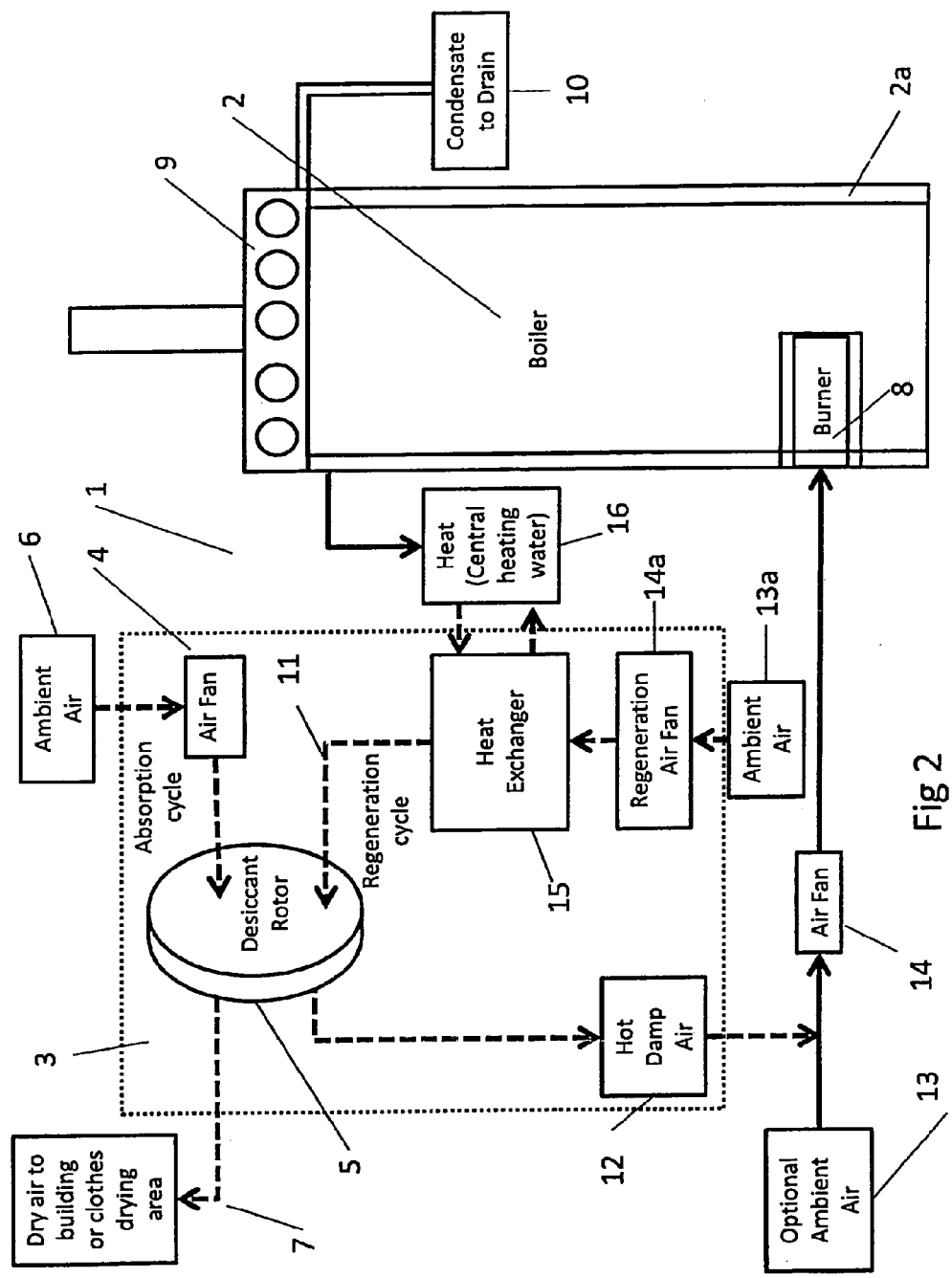

The invention will be more clearly understood from the following description of some embodiments thereof, given by way of example only, with reference to the accompanying drawing, in which:

FIG. 1 is a stylised schematic of a combined condensing boiler and dehumidification system according to the invention, and FIG. 2 is a stylised schematic of a combined condensing boiler and dehumidification system according to a further embodiment of the invention.

For the purpose of the present invention the term high relative humid air stream will be understood to mean an air stream having gained moisture in the apparatus. Conversely, the term low relative humid air stream will be understood to mean an air stream having had moisture removed in the apparatus.

It will also be understood that the channelling and feeding of fluid streams between the boiler and the dehumidifier is accomplished by the use appropriate conduits, pipes and ducts which are adapted to transmit fluids, including both gas and liquids as required.

Referring to FIGS. 1 and 2, there is shown a combined boiler dehumidification system, indicated generally by the reference numeral 1 comprising a boiler 2 and a desiccant dehumidifier 3. The boiler 2 and the dehumidifier 3 may be integrated as a single unit, or provided as separate but interconnectable units. The desiccant dehumidifier is operable such that ambient air 6 is removed from the built environment via air fan 4, passed through the desiccant rotor 5 whereby an absorption cycle takes place to remove moisture from the air intake. Dry air 7 is then returned to the built environment, and may be used to dry laundry.

To re-use the desiccant in rotor 5 within the dehumidifier 3 it must be reactivated using a process in which the captured moisture is driven off by heat from an energy source. To provide a suitable energy source the dehumidifier 3 is coupled to the boiler 2.

In the boiler 2 fuel is burned by a burner 8 (or in the case of solid fuel, a hearth) and the hot gases produced are passed through a heat exchanger which may be within the boiler 2 (such as a water jacket, burner jacket or condenser pipes 9 of FIG. 1) or within or adjacent to a dehumidifier 3 (shown as heat exchanger 15 in FIG. 2).

In the boiler water jacket 2a and heat exchanger 9, the heat from the hot gasses of the boiler 2 are transferred to water, which has the effect of raising the water's temperature. One of the hot gases produced in the combustion process is water vapour (steam), which arises from burning the hydrogen content of the fuel. In the instance shown in FIG. 1, the boiler 2 is a condensing boiler with an integrated heat exchanger 9 to extract additional heat from the waste gases by condensing this water vapour to liquid water in order to recover its latent heat. The production of this condensate also requires the installation of a heat exchanger condensate drainage pipe 10 normally associated with condensing boilers.

The boiler 2 is also coupled to the dehumidifier 3, such that a heated air stream 11 produced by circulating ambient air through the burner or hearth heat exchanger, shown as a burner shell in FIG. 1, or the heat exchanger 15, as shown in FIG. 2, is channelled to the dehumidifier 3 to provide regeneration air for the desiccant material 5 in the dehumidifier 3. In this way low grade heat from the boiler 2 is being used as a cheap primary heat source, and therefore has lower carbon emissions than would be involved if electricity were used by the absorption dehumidifier 3. In the case of a biomass boiler the heat has no carbon emissions associated with it. Such a feature serves to further lower the burner temperature to further reduce NOx production. The dehumidifier 3 is an integrated part of the boiler 2 and together with boiler 2 may reduce a buildings overall carbon emissions.

The channelling of heated air to the dehumidifier to regenerate the desiccant, as well as the channelling of the air stream from the boiler to the dehumidifier may be regulated, that is, switched on and off by control means.

Additionally, a high relative humid air stream 12 discharged from the dehumidifier 3 is channelled to a burner 8 of the boiler 2. This humid air is used within the burner 8 thus reducing NOx production due to the higher moisture content of the combustion gases. The elevated temperature of the burner air also increases the boiler combustion efficiency.

Optionally, ambient air 13 is channelled from the ambient into the burner 8 by a fan 14 of the dehumidifier 3. In FIG. 1, air is thus bled from the fan discharge and circulated as a coolant within the burner 8 thus reducing flame temperature and consequently NOx production while providing hot air 11 for the regeneration of desiccant 5.

In the embodiment shown in FIG. 2, regeneration air is heated externally from the boiler in the heat exchanger 15, by for example, transfer of heat from water 16 heated by the boiler 2. The same heating could be done by an external heat source such as solar power. In FIG. 2, ambient air 13a may optionally be mixed with the regeneration air being channelled into the heat exchanger 15 by a fan 14a of the dehumidifier 3 as required to obtain the desired stoichiometric air/fuel mix for the burner 8.

The condensate drain 10 for channelling condensate generated during combustion (associated with condensing boilers) also channels moisture recovered from the high relative humid air stream 12 discharged from the dehumidifier 3 out of the boiler 2.

The present invention thus provides an innovation in which moisture removed from a building is condensed and removed from the building in the boiler condenser 9 together with the condensate formed in the combustion reaction of the burner 8. This arrangement is highly energy efficient as the heat of vaporisation of the moisture from the building is recovered in the boiler 2. Channelling air to the burner or hearth lowers the combustion temperature by circulating air through it to cool it, and by adding moisture recovered from the built environment to the air used in the combustion process, NOx emissions are thus reduced both by lowering combustion temperatures and increasing the moisture content of the combustion gases. The present invention has important utility for biomass boilers which are considered to have higher NOx emissions due to the relatively high nitrogen content of the fuel.

The desiccant 5 is efficiently regenerated with low grade heat from the burner 8 (or hearth in the case of solid fuels) of the boiler 2. Importantly, the heat used in the regeneration is not lost from the system but recovered in the boiler 2 and the condensate heat exchanger 9.

The present invention will increase boiler combustion efficiency up to at least 98% whilst reducing undesirable NOx emissions up to at least 14%.

Aspects of the present invention have been described by way of example only and it should be appreciate that additions and/or modifications may be made thereto without departing from the scope thereof as defined in the appended claims.

The invention claimed is:

1. A dehumidification apparatus comprising:
   a desiccant dehumidifier;
   coupling means for connecting the dehumidifier to a water heating boiler operable to generate a heated air stream;
   channelling means to channel the heated air stream to the dehumidifier to regenerate desiccant material of the dehumidifier;
   channeling means for channeling an air stream discharged by the dehumidifier to the boiler; and
   mixing means operable to combine ambient air with the air stream discharged by the dehumidifier and wherein the air stream discharged by the dehumidifier is received at a burner of the boiler.

2. A dehumidification apparatus as claimed in claim 1, in which water heated by the boiler is used to heat the air stream channelled to the dehumidifier.

3. A dehumidification apparatus as claimed in claim 1, in which the boiler comprises a drain for removing waste fluids generated during combustion in the boiler and moisture discharged from the dehumidifier.

4. A dehumidification apparatus as claimed in claim 1, in which the boiler and the dehumidifier are integrated as a single unit.

5. A dehumidification apparatus as claimed in claim 1, in which the dehumidifier is a separate unit from the boiler, and the apparatus comprises retrofit couplings enabling retrofitting to the boiler.

6. A dehumidification apparatus as claimed in claim 1, in which the boiler is a condenser boiler.

7. A method of regenerating desiccant material of a dehumidifier characterised by the steps of:
   coupling a desiccant dehumidifier to a water heating boiler operable to generate a heated air stream;
   channelling the heated air stream to the dehumidifier to regenerate desiccant material of the dehumidifier;
   channeling an air stream discharged by the dehumidifier to the boiler; and
   channeling the air stream discharged by the dehumidifier to a burner of the boiler and combining ambient air with the air stream discharged by the dehumidifier.

8. A method of regenerating desiccant material of a dehumidifier as claimed in claim 7, comprising a further step of integrating the boiler and the dehumidifier as a single unit.

9. A method of regenerating desiccant material of a dehumidifier as claimed in claim 7, comprising a further step of retrofitting the dehumidifier to the boiler or retrofitting the boiler to the dehumidifier.

* * * * *